(12) United States Patent
Wen et al.

(10) Patent No.: US 10,816,184 B2
(45) Date of Patent: *Oct. 27, 2020

(54) LIGHTING DEVICE AND LUMINAIRE

(71) Applicant: SIGNIFY HOLDING B.V., Eindhoven (NL)

(72) Inventors: Tian Xiang Wen, Shanghai (CN); Robertus Leonardus Tousain, Shanghai (CN); Yun Wang, Shanghai (CN); Zhigang Pei, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,281

(22) Filed: Sep. 30, 2019

(65) Prior Publication Data
US 2020/0025362 A1    Jan. 23, 2020

Related U.S. Application Data

(63) Continuation of application No. 15/323,443, filed as application No. PCT/EP2015/062064 on Jun. 1, 2015, now Pat. No. 10,458,639.

(30) Foreign Application Priority Data

Jul. 1, 2014   (WO) ............... PCT/CN2014/081414
Sep. 25, 2014  (EP) ................................... 14186430

(51) Int. Cl.
*F21V 25/10*    (2006.01)
*F21K 9/278*    (2016.01)
(Continued)

(52) U.S. Cl.
CPC ............. *F21V 25/10* (2013.01); *F21K 9/272* (2016.08); *F21K 9/278* (2016.08); *F21V 23/02* (2013.01);
(Continued)

(58) Field of Classification Search
CPC ........ F21V 25/10; F21V 23/003; F21V 23/02; F21V 23/06; F21K 9/272; F21K 9/278;
(Continued)

(56) References Cited

U.S. PATENT DOCUMENTS 8,698,398 B2    4/2014  Dellian
8,779,693 B1 *  7/2014  Blalock ............. H05B 33/0854
                                                   315/291
(Continued)

FOREIGN PATENT DOCUMENTS

CN    202209546 U    5/2012
JP    H08115778 A2   5/1996
(Continued)

*Primary Examiner* — Cara E Rakowski
*Assistant Examiner* — Jessica M Apenteng
(74) *Attorney, Agent, or Firm* — Akarsh P. Belagodu

(57) ABSTRACT

A tubular LED lighting device (10) comprising an LED, a driver (18) for driving the LED, and an electrical connector (14). The lighting device further comprises a thermally triggered switch (16) for prevention of overheating of the electrical connector. The thermally triggered switch is connected in series between the electrical connector and the driver, and the thermally triggered switch is configured to interrupt current in the event of the temperature of the electrical connector meeting a triggering condition. If a significant degree of arcing occurs the electrical connector will heat up such that the triggering condition will be met and the current flow between the electrical connector and the driver will be interrupted. There is also provided a luminaire (20) comprising the tubular LED lighting device.

13 Claims, 1 Drawing Sheet

(51) Int. Cl.
   *F21K 9/272*    (2016.01)
   *F21V 23/02*    (2006.01)
   *F21V 23/06*    (2006.01)
   *H02H 3/08*     (2006.01)
   *F21Y 115/10*   (2016.01)
   *H01R 33/95*    (2006.01)
   *F21Y 103/10*   (2016.01)

(52) U.S. Cl.
   CPC ............. *F21V 23/06* (2013.01); *H02H 3/085* (2013.01); *F21Y 2103/10* (2016.08); *F21Y 2115/10* (2016.08); *H01R 33/95* (2013.01)

(58) Field of Classification Search
   CPC . H02H 3/085; F21Y 2103/10; F21Y 2115/10; F21Y 2103/00; H01R 33/95
   USPC ........................................................ 362/221
   See application file for complete search history.

(56) References Cited

U.S. PATENT DOCUMENTS

| | | | |
|---|---|---|---|
| 2013/0082601 A1 | 4/2013 | Bradford | |
| 2013/0127327 A1* | 5/2013 | Heil | F21V 25/04 |
| | | | 313/313 |
| 2014/0104824 A1 | 4/2014 | Hsia et al. | |

FOREIGN PATENT DOCUMENTS

| | | |
|---|---|---|
| JP | 2009032523 A | 2/2009 |
| JP | 2011086602 A | 4/2011 |
| WO | 2014122270 A1 | 8/2014 |

\* cited by examiner

LIGHTING DEVICE AND LUMINAIRE

CROSS-REFERENCE TO PRIOR APPLICATIONS

This application is a continuation of U.S. application Ser. No. 15/323,443, filed on Jan. 3, 2017, which is a U.S. National Phase application under 35 U.S.C. § 371 of International Application No. PCT/EP2015/062064, filed on Jun. 1, 2015, which claims the benefits of European Patent Application No. 14186430.6, filed on Sep. 25, 2014 and Chinese Patent Application No. PCT/CN2014/081414, filed on Jul. 1, 2014. These applications are hereby incorporated by reference herein.

FIELD OF THE INVENTION

The present invention relates to a tubular LED lighting device comprising a thermally triggered switch.

BACKGROUND OF THE INVENTION

InstantFit TLED (instant fitting tubular LED lighting device, throughout this specification, unless the context clearly requires otherwise TLED refers to InstantFit TLED) is a retrofit lighting device for tubular fluorescent lamp (TL) fittings. The TL fitting may be a standard fitting for tubular fluorescent lamps, such as T8/T5/T10 etc. Many common fittings or luminaires for tubular fluorescent lamps comprise a high frequency (HF) ballast, such a ballast is a common component of fittings for tubular fluorescent lamps, as is known to the skilled person. As the HF ballast and TL system is widely used throughout the world, and as TLEDs are increasing used as replacements for tubular fluorescent lamps, InstantFit TLEDs are most easily installed without removing the HF ballasts.

As a result of the inclusion of a HF ballast, the output of the fitting to the lighting device is designed as a constant current source with a high frequency (up to 100 kHz), a change in the load (in this case the TLED) has limited impact on the current output of the ballast. Therefore, if the TLED is not properly connected to the lamp fitting or luminaire, for example, because there is some distance between the lighting device electrical connector and lamp fitting electrical connector, arcing between the electrical connector of the lighting device and the electrical connector of the lamp fitting will result. This arcing and/or intermittent contact at HF may result high temperatures which could melt the lamp holder, possibly overheat the total system, and, in a worst case, cause a safety problem. Therefore, a solution is required to prevent or at least substantially reduce this problem; in particular, it is desired to provide a safer InstantFit TLED.

FIG. 1 shows the total system of a TLED 10 mounted in a lamp fixture or luminaire 20 which includes a HF ballast. The inclusion of a HF ballast is one of the most common configurations for tubular fluorescent lamp fittings. The lamp fixture or luminaire 20 and ballast can be 1/2/3/4 lamp system, in which 1, 2, 3 or 4 TLEDs can be mounted in the luminaire 20.

FIG. 2 shows that if the electrical connectors of the lighting device are not properly connected to lamp holder 22, then a gap A or B may form. Whether the gap is at the end A or B or both depends on the end-user's installation of the TLED 10 in the luminaire 20. In the situation such as that illustrated in FIG. 2, the gap between the TLED and lamp holder can cause arcing as a result of the inclusion of a ballast in the luminaire 20. As the HF ballast operates as a HF constant current source, gaps A and/or B can result in intermittent contact and result in high impedance. Accordingly, the HF constant current source can cause arcing across the gaps A and/or B; in turn this can result in a high temperature. If the lighting device and ballast are not shut down quickly enough, the arcing may overheat the components of the luminaire and/or lighting device, including the lamp holder and/or the fixture, this can create a safety hazard.

CN202209546U discloses a LED fluorescent tube with a temperature sensing device on PCB and a fuse on PCB. Both of the temperature sensing device and fuse operate according to the height of temperature on the PCB. The temperature of the electrical connectors of the tube is not considered.

U.S. Pat. No. 8,698,398B2 discloses a fuse for a LED fluorescent lamp retrofit lamp. The fuse comprises a first electrical fuse connecting element rigidly connected to a connecting pin of the lamp, and a second electrical fuse connecting element connected to a driver. Such fuse ensures a mechanical connection for the fuse to the LED FL retrofit lamp which is not susceptible to faults. However, the fuse is an electrical fuse, which means it only operates according to the electrical current flows therethrough. The temperature of the electrical connectors of the tube is not considered.

JP2011086602A discloses a luminaire for a tubular LED lamp. A current limiting thermostat monitoring the internal measurement temperature is provided to prevent the failure of lamp by overcurrent. The temperature of the electrical connectors of the tube is not considered.

WO2014122270A1 discloses a LED lamp with protection circuit preventing overheating of the LED/PCB. The temperature of the electrical connectors of the tube is not considered.

US20130082601A1 discloses a system controller in a lighting device to monitor a drive current and prevent overcurrent. The temperature of the electrical connectors of the tube is not considered.

SUMMARY OF THE INVENTION

The present invention seeks to provide a tubular LED lamp comprising safety features which can prevent the total system from overheating.

The present invention further seeks to provide a luminaire including such a lighting device.

The invention provides a tubular LED lighting device comprising an LED, a driver for driving the LED, and an electrical connector. The lighting device also comprises a thermally triggered switch for prevention of overheating of the electrical connector. The thermally triggered switch is connected in series between the electrical connector and the driver, and is configured to interrupt current in the event of the temperature of the electrical connector meeting a triggering condition.

If a significant degree of arcing occurs between the electrical connector of the lighting device and a fitting in which the lighting device is fitted, the electrical connector will heat up such that the triggering condition will be met and the current flow between the electrical connector and the driver will be interrupted. In this way, the current flow is interrupted before the electrical connector can overheat as a result of arcing. Consequently, the current flow is also interrupted before the lighting device or the luminaire can overheat as a result of arcing. Additionally, most common ballasts will shut down automatically as a result of the current flow interruption in a similar manner to as if no lighting device were present. Accordingly, in the event of arcing occurring due to, for example, a poorly connected lighting device, the lighting device will shut down and remain safe, i.e. not overheat.

A particular feature of this lighting device is that the safety features are included in the lighting device, such that retrofitting of the LED lighting device into a fixture for a tubular fluorescent lamp also installs the thermally triggered switch, without additional action required on the part of the end user.

The thermally triggered switch may be a thermal fuse or thermal relay. Such thermally triggered switches may be particularly simple and economic.

The thermally triggered switch may be connected in series with the electrical connector via a connection lead of the thermally triggered switch. This construction may be particularly simple and therefore economic.

The thermally triggered switch may be configured to sense the temperature of the electrical connector via a main body of the thermally triggered switch.

The thermally triggered switch may be configured to sense the temperature of the electrical connector via a probe of the thermally triggered switch. Such a construction may be advantageous, for example, with such a construction it is possible for the thermally triggered switch to be remote the electrical connector such that more freedom is provided to the designer as to the location of the thermally triggered switch.

The thermally triggered switch may comprise a circuit breaking part and a temperature detecting part. For example, the circuit breaking part may comprise electrical circuitry and the temperature detecting part may comprise a thermistor.

The circuit breaking part and the temperature detecting part may be the same part. For example, the circuit breaking part and the temperature detecting part may both be the fusible link of a thermal fuse.

The thermally triggered switch may be manually resettable. For example, the thermally triggered switch may be a thermal fuse with a manual reset function.

The thermally triggered switch may be automatically resettable. For example, the thermally triggered switch may be a positive temperature coefficient resistance device which automatically resets upon removal of an applied heat after a period of time. The benefit is that it is not needed for a user to disassemble the tubular LED lamp for replacing a blown fuse.

The triggering condition may comprise meeting a predetermined temperature for a predetermined period of time. Accordingly, interruption of current flow as a result of false positives may be avoided.

The lighting device may further comprise at least one end cap and the thermally triggered switch may be within the end cap.

The lighting device may comprise an electrical connector at each end of the lighting device and the thermally triggered switch may be configured to prevent each electrical connector from overheating. It is common for lamp fittings for tubular lighting devices to have electrical connectors at both ends and such an arrangement prevents the electrical connector at each end from overheating.

The lighting device may comprise an electrical connector at each end of the lighting device and a thermally triggered switch at each end of the lighting device for prevention of overheating of each respective electrical connector.

Such an arrangement may be particularly economic, in particular, two simple and therefore cheap thermally triggered switches may be provided.

Each end of the lighting device may comprise two electrical connectors and the thermally triggered switch may be configured to prevent each electrical connector from overheating or multiple thermally triggered switches are provided to prevent each respective electrical connector from overheating.

It is common for lamp fittings for tubular lighting devices to have two electrical connectors at each end and such an arrangement prevents each electrical connector of the lighting device from overheating.

There is also provided a luminaire comprising the tubular LED lighting device described above. Such a luminaire may provide the advantages discussed above, in particular, the luminaire may be safer than prior art luminaires.

The luminaire may comprise a ballast, for example a HF ballast.

The invention also provides a luminaire for a tubular LED lighting device comprising a HF ballast, an electrical connector for the lighting device, and a thermally triggered switch for prevention of overheating of the electrical connector. The thermally triggered switch is connected in series between the ballast and the electrical connector and is configured to interrupt current to the LED lighting device in the event of the temperature of the electrical connector meeting a triggering condition.

This can provide similar advantages to the lighting device discussed above; however, the thermally triggered switch is installed separately from the lighting device.

There is also provided a tubular LED lamp comprising: at least one LED light source, at least one driver for powering the LED light source, and lamp pins; the tubular LED lamp further comprising a thermally triggered switch for protection against overheating of the lamp pins, wherein the thermally triggered switch is connected in series between at least one of the lamp pins and the driver, and the thermally triggered switch is designed to sense the temperature of at least one of the lamp pins, and to interrupt current in case the temperature reaches a trigging level.

In an embodiment, the thermally triggered switch is a thermal fuse, a bimetallic switch or a thermal relay.

In an embodiment, the thermally triggered switch is designed to sense the temperature of at least one of the lamp pins via a pin of the thermally triggered switch.

In an embodiment, the thermally triggered switch is designed to sense the temperature of at least one of the lamp pins via a main body or a probe of the thermally triggered switch.

When arcing occurs, as the thermal fuse is in contact with the lamps pins where the arcing occurs the thermal fuse can easily go to an open state in reaction to high temperature, thus it will cut off the ballast output main loop and then ballast will go to protection automatically. As a result, the system may not overheat and remain safe.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
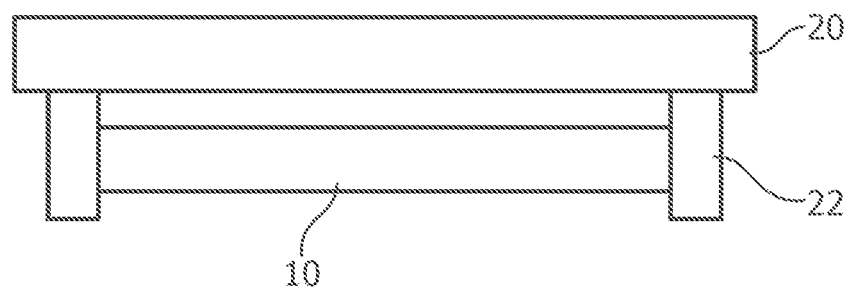
FIG. 1 shows a total TLED retrofit lamp system.
Figure 2:
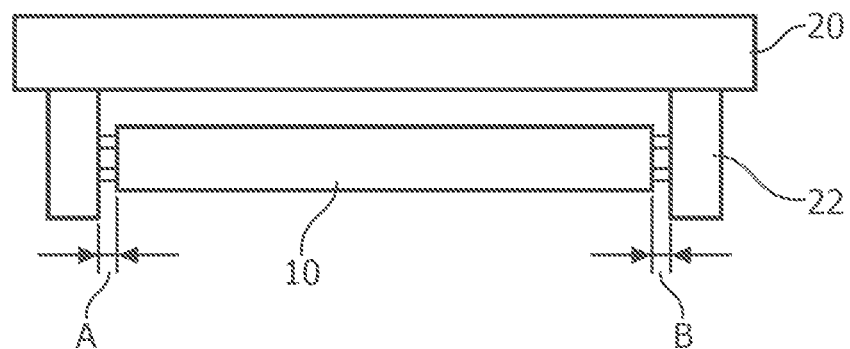
FIG. 2 shows the gaps between the lamp holder and electrical connectors of the lighting device when poorly connected.

It should be understood that the Figures are merely schematic and are not drawn to scale. It should also be understood that the same reference numerals are used throughout the Figures to indicate the same or similar parts.

Figure 3:
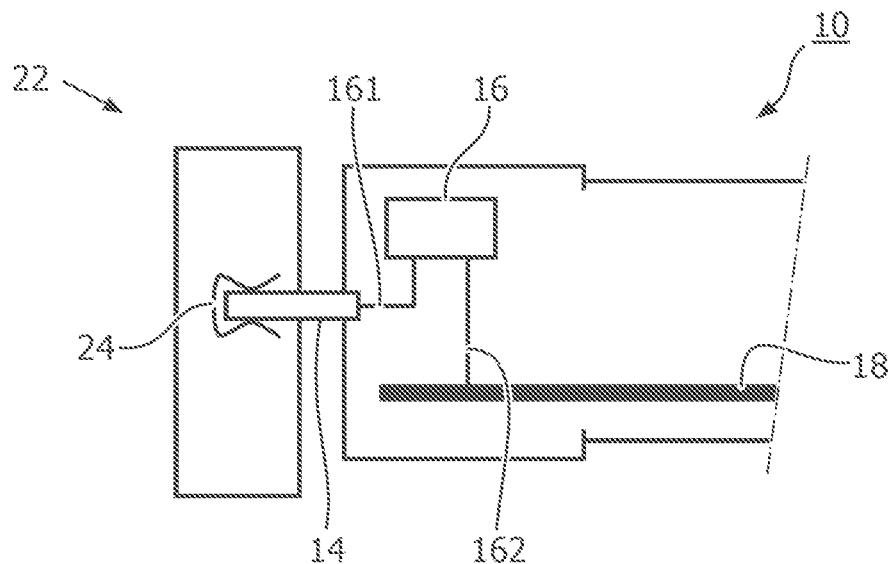
FIG. 3 shows a thermally triggered switch incorporated in a lighting device of the present invention.

As shown in FIG. 3, a thermally triggered switch 16 is included at the power input end of a tubular LED lighting device (TLED) for the prevention of the above mentioned safety problem. In FIG. 3, only one side of lamp system is shown, the other end of the lighting device may be symmetrical.

The tubular LED lighting device 10 comprises an LED, a driver for driving the LED, and an electrical connector 14. The thermally triggered switch 16 is for prevention of overheating of the electrical connector 14. The thermally triggered switch 16 is connected in series between the electrical connector 14 and the driver, and is configured to interrupt current in the event of the temperature of the electrical connector 14 meeting a triggering condition.

The thermally triggered switch 16 may have a connection lead 161 which may be connected to the electrical connector 14 directly. Another connection lead 162 of the thermally triggered switch 16 may be connected to a driver PCB 18 of the tubular LED lighting device 10. In this way, the heat dissipation on to the electrical connector 14 can be easily detected by the thermally triggered switch 16. If an arc is generated between the electrical connector 14 and the electrical connector 24 of the lamp holder 22, the safety device will interrupt current flow when the temperature of the electrical connector 14 reaches a triggering condition. As a result the TLED 10 will shut down as no power is supplied from the HF ballast. Further, the ballast enters a protection mode or shuts down as a result of having an open load. The system will thus not overheat and remain safe.

A particular feature of this lighting device 10 is that the safety features are included in the lighting device, such that retrofitting of the LED lighting device into a fixture or luminaire 20 for a tubular fluorescent lamp also installs the thermally triggered switch 16, without additional action required on the part of the end user.

The thermally triggered switch 16 may be a thermal fuse or a thermal relay. Alternatively, the thermally triggered switch 16 may be any other component capable of interrupting current in the event of the temperature of the electrical connector 14 meeting a triggering condition.

The thermally triggered switch 16 may be connected in series with the electrical connector via a connection lead 161 of the thermally triggered switch. The connection lead can thus function as both an electrical connector and also a thermal connection; this construction can therefore be particularly simple and therefore economic.

The connection leads 161, 162 of the thermally triggered switch may be pins, for example if the thermally triggered switch 16 is a thermal fuse the connection leads 161, 162 may be pins of a thermal fuse. Alternatively the connection leads 161, 162 may be any other electrical connection as will be familiar to the skilled person, for example, copper wires or insulated copper wires.

The thermally triggered switch 16 may be thermally connected to the electrical connector 14. The thermal connection could take place by any means, for example, by means of the connection lead 161 or simply by being in close proximity with the electrical connector 14.

The electrical connector 14 of the TLED 10 may be a lamp pin. The electrical connector 24 of the lamp holder 22 may be a socket. Other electrical connectors 14, 24 will be familiar to the skilled person.

This TLED 10 can also be used as an InstantFit TLED to replace other lamps driven on a current source, for example PL-L, PL-C etc. (PL-L and PL-C designate Philips Pi shape fluorescent lamps). That is, the tubular lighting device 10 may be non-linear. Alternatively, the tubular lighting device 10 may be linear, as is common in the art and known to the skilled person.

The thermally triggered switch 16 may be mounted on a printed circuit board 18 or another carrier. In particular, the thermally triggered switch 16 may be mounted on the same printed circuit board 18 or carrier as the driver.

The thermally triggered switch 16 may additionally function as an electrical connection part between the electrical connector 14 of the lighting device 10 and a printed circuit board 18 or other carrier.

The lighting device 10 may further comprise at least one end cap and the thermally triggered switch 16 may be within the end cap.

The lighting device 10 may comprise an electrical connector at each end of the lighting device 10 and the thermally triggered switch 16 may be configured to prevent each electrical connector from overheating. It is common for lamp fittings for tubular lighting devices to have electrical connectors at both ends and such an arrangement prevents each electrical connector from overheating.

The lighting device 10 may comprise an electrical connector 14 at each end of the lighting device 10 and a thermally triggered switch 16 at each end of the lighting device 10 for prevention of overheating of each respective electrical connector 14. Where economic thermally triggered switches are used such an arrangement may be advantageously economic.

Each end of the lighting device 10 may comprise two electrical connectors 14 and the thermally triggered switch 16 may be configured to prevent each electrical connector 14 from overheating Alternatively, multiple thermally triggered switches 16 may be provided to prevent each respective electrical connector 14 from overheating. It is common for lamp fittings for tubular lighting devices to have two electrical connectors at each end and such an arrangement prevents each electrical connector of the lighting device from overheating.

As an alternative to that discussed above, the thermally triggered switch 16 may be configured to sense the temperature of the electrical connector 14 via a probe of the thermally triggered switch 16. In this construction heating of the electrical connector results in heating of the probe of the thermally triggered switch 16, in turn this results in interruption of current in the event of the electrical connector 14 meeting the triggering condition. Such a construction may be advantageous, for example, with such a construction it is possible for the thermally triggered switch 16 to be remote from the electrical connector 14 such that more freedom is provided to the designer as to the location of the thermally triggered switch 16. For example, a single thermally triggered switch 16 having two probes may be provided, the first probe may be configured to detect the temperature of an electrical connector at a first end of the lighting device and the second probe may be configured to detect the temperature of an electrical connector at a second, opposite, end of the lighting device; the thermally triggered switch may then be configured to interrupt current in the event of the temperature of an electrical connector at either end of the lighting device meeting a triggering condition, even though some components or elements of the thermally triggered switch may be remote from one or both ends of the lighting device.

The thermally triggered switch 16 may comprise a circuit breaking part and a temperature detecting part. The temperature detecting part and the circuit breaking part may be functionally connected, such that the thermally triggered switch interrupts current in the event of the temperature of the electrical connector meeting a triggering condition. For example, the circuit breaking part may comprise electrical circuitry and the temperature detecting part may comprise a thermistor. In such a case, the electrical circuitry may be configured to detect a change in the electrical characteristics of the thermistor and then interrupt current flow in the event of a triggering condition being reached.

Alternatively, the circuit breaking part and the temperature detecting part may be the same part. For example, the circuit breaking part and the temperature detecting part may both be the fusible link of a thermal fuse.

The thermally triggered switch 16 may be manually resettable. For example, the thermally triggered switch 16 may be a thermal fuse with a manual reset function.

The thermally triggered switch 16 may be automatically resettable. For example, the thermally triggered switch 16 may be a positive temperature coefficient resistance which automatically resets upon removal of an applied voltage after a period of time.

The use of a resettable thermally triggered switch 16 may be advantageous, as after the thermally triggered switch 16 has interrupted a current flow, the lighting device 10 may then be correctly installed and used without the need to replace the thermally triggered switch 16.

The triggering condition may comprise meeting a predetermined temperature for a predetermined period of time. Accordingly, exceeding the predetermined temperature for a short period may not meet the triggering condition, such that interruption of current flow as a result of "false positives" is avoided. However, if the temperature exceeds the predetermined value for a longer period then the current flow may be interrupted.

There is also provided a luminaire 20 comprising the tubular LED lighting device 10 of the invention. Such a luminaire 20 may provide the advantages discussed above, in particular, the luminaire 20 may be safer than prior art luminaires. The luminaire 20 may comprise a ballast.

The luminaire 20 may be a holder of the lighting device 10, e.g. a ceiling light fitting, an armature for fitting underneath a cabinet or the like, an apparatus into which the lighting device is integrated, e.g. a cooker hood or the like, and so on. The luminaire 20 may comprise a plurality of lighting devices 10. The lighting devices 10 may be fitted in a housing of the luminaire 20 comprising a light exit window. The light exit window may comprise beam shapers such as one or more lens arrays, reflectors and so on. Alternatively, the light exit window may simply be formed by an opening in the housing. The internal surfaces of the housing may be reflective to reflect light that exits the lighting devices 10.

In a non-limiting example, the luminaire 20 may be a ceiling armature, e.g. an armature that may be integrated in a suspended ceiling. Other examples of such luminaires 20 will be apparent to the skilled person.

In an alternative embodiment, there is provided a luminaire for a tubular LED lighting device comprising a ballast, an electrical connector for the lighting device, and a thermally triggered switch for prevention of overheating of the electrical connector. The thermally triggered switch is connected in series between the ballast and the electrical connector and is configured to interrupt current to the LED lighting device in the event of the temperature of the electrical connector meeting a triggering condition.

This can provide similar advantages to the lighting device discussed above; however, the thermally triggered switch is installed separately from the lighting device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A tubular LED lighting device comprising:
an LED, a driver for driving the LED, and an electrical connector;
the lighting device further comprising a thermally triggered switch for prevention of overheating of the electrical connector, wherein the thermally triggered switch is configured to interrupt current in the event of the temperature of the electrical connector meeting a triggering condition; and
wherein the thermally triggered switch is configured to sense the temperature of the electrical connector via a main body or a probe of the thermally triggered switch.

2. The tubular LED lighting device according to claim 1, wherein the thermally triggered switch is one of a thermal fuse, a bimetallic switch and a thermal relay.

3. The tubular LED lighting device according to claim 1, wherein the thermally triggered switch is connected in series with the electrical connector via a connection lead of the thermally triggered switch.

4. The tubular LED lighting device according to claim 1, wherein the thermally triggered switch comprises a circuit breaking part and a temperature detecting part.

5. The tubular LED lighting device according to claim 1, wherein the thermally triggered comprises a single part that performs both circuit breaking and temperature detecting.

6. The tubular LED lighting device according to claim 1, wherein the thermally triggered switch can be reset manually or automatically.

7. The tubular LED lighting device according to claim 1, wherein the triggering condition comprises meeting a predetermined temperature for a predetermined period of time.

8. The tubular LED lighting device according to claim 1, further comprising at least one end cap and the thermally triggered switch is within the end cap.

9. The tubular LED lighting device according to claim 8, wherein the lighting device comprises an electrical connector at each end of the lighting device and the thermally triggered switch is configured to prevent each electrical connector from overheating.

10. The tubular LED lighting device according to claim 8, wherein the lighting device comprises an electrical connector at each end of the lighting device and a thermally triggered switch at each end of the lighting device for prevention of overheating of each respective electrical connector.

11. The tubular LED lighting device according to claim 8, wherein each end of the lighting device comprises two electrical connectors and the thermally triggered switch is configured to prevent each electrical connector from overheating or multiple thermally triggered switches are provided to prevent each respective electrical connector from overheating.

12. A luminaire comprising a tubular LED lighting device according to claim 1.

13. The luminaire according to claim 12, further comprising a HF ballast.

\* \* \* \* \*